United States Patent
Donohue et al.

(10) Patent No.: US 10,534,706 B1
(45) Date of Patent: Jan. 14, 2020

(54) AUTOMATED GARBAGE COLLECTION ARCHITECTURE

(71) Applicant: Workday, Inc., Pleasanton, CA (US)

(72) Inventors: Seamus Donohue, Walnut Creek, CA (US); Sergio Mendiola Cruz, Dublin, CA (US); Ken Pugsley, Kansas City, MO (US); John Levey, Dublin (IE); Gerald Green, San Jose, CA (US); Iacopo Pace, Dublin (IE)

(73) Assignee: Workday, Inc., Pleasanton, CA (US)

( * ) Notice: Subject to any disclaimer, the term of this patent is extended or adjusted under 35 U.S.C. 154(b) by 861 days.

(21) Appl. No.: 14/970,260

(22) Filed: Dec. 15, 2015

(51) Int. Cl.
*G06F 16/00* (2019.01)
*G06F 12/02* (2006.01)
*G06F 16/23* (2019.01)

(52) U.S. Cl.
CPC ...... *G06F 12/0253* (2013.01); *G06F 16/2379* (2019.01); *G06F 2212/1044* (2013.01)

(58) Field of Classification Search
CPC .. G06F 16/00; G06F 16/1727; G06F 16/1748; G06F 16/1752; G06F 16/182; G06F 16/2365
See application file for complete search history.

(56) References Cited

U.S. PATENT DOCUMENTS

| | | | | |
|---|---|---|---|---|
| 6,167,535 A | * | 12/2000 | Foote ................ | G06F 11/3636 714/38.11 |
| 9,213,638 B1 | * | 12/2015 | Kumpera ............ | G06F 12/0269 |
| 2012/0166744 A1 | * | 6/2012 | Yamashita .......... | G06F 12/0261 711/159 |
| 2012/0246204 A1 | * | 9/2012 | Nalla ................. | G06F 12/0253 707/815 |
| 2013/0138703 A1 | * | 5/2013 | Daynes ............... | G06F 9/44521 707/813 |

* cited by examiner

*Primary Examiner* — Dinku W Gebresenbet
(74) *Attorney, Agent, or Firm* — Van Pelt, Yi & James LLP

(57) ABSTRACT

A system for data management includes a root object, zero, one, or more member objects, and a processor. The root object is associated with a garbage collection root metadata. Each of the one or more member objects is associated with a garbage collection member metadata. The root object has a direct relation or an indirect relation to each of the one or more member objects. The processor is to determine that an object is the root object; determine whether the root object and the one or more member objects are to be garbage collected; and garbage collect the root object and the one or more member objects in the event that the root object and the one or more member objects are to be garbage collected.

21 Claims, 11 Drawing Sheets

AUTOMATED GARBAGE COLLECTION ARCHITECTURE

BACKGROUND OF THE INVENTION

A database system stores information for a computer system. As data is input into the database system, data structures to store the information are created. Some data structures store data that does not need to be permanently kept by the database system—for example, temporary data that was unnecessarily persisted. This data uses up valuable resources resulting in a computer system that runs inefficiently. In some cases, an application developer is relied on to properly remove unneeded data structures. However, this is also inefficient in addition to being error prone.

BRIEF DESCRIPTION OF THE DRAWINGS

Various embodiments of the invention are disclosed in the following detailed description and the accompanying drawings.

DETAILED DESCRIPTION

Figure 1:
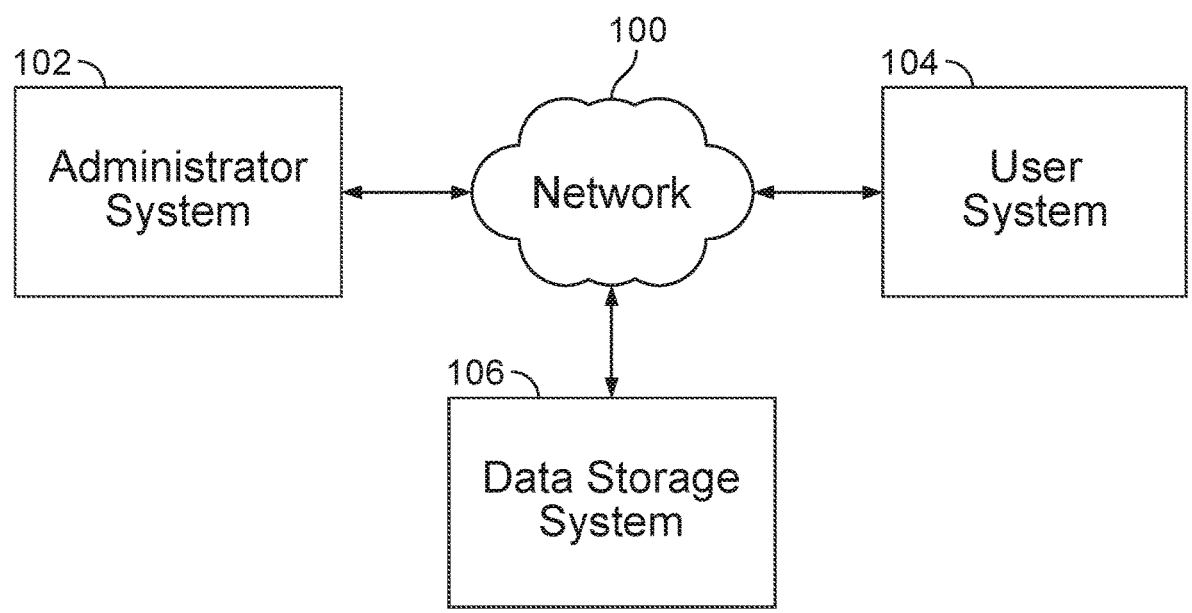
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An automated garbage collection architecture is disclosed. A system for data management comprises: a root object, wherein the root object is associated with a garbage collection root metadata; zero, one or more member objects, wherein each of the one or more member objects is associated with a garbage collection member metadata, wherein the root object has a direct relation or an indirect relation to each of the one or more member objects; and a processor to: determine that an object is the root object; determine whether the root object is to be garbage collected; and in the event that the root object is to be garbage collected, garbage collect the root object and the one or more member objects.

In some embodiments, an object oriented database stores information in a network of data storage objects. In various embodiments, an object in the database represents an item, an employee, a performance review, a payroll result, a site, a location, or any other appropriate object. Objects comprise data and relations to other objects. Some objects represent committed or persisted items or parts of items that should be removed under certain circumstances—for example, a detailed performance review information that is more than a year old, an intermediate payroll information that was committed for which the payroll run was not actually used, etc. Objects that may require removal from the database are tagged with garbage collection metadata, to signal to a garbage collector that the object should be checked for removal. Data structures stored in an object oriented database typically take the form of object trees, comprising a root object representing the entity as a whole, and member objects representing various parts of the entity or values describing the entity. In some embodiments, data structures in the object oriented database take the form of object graphs, which via processing end-up becoming object trees (i.e., an object graph with no cycles), which enables the system to distinguish strongly connected sub-graphs that share the same data life progression and must be garbage collected together. For data structures that can be garbage collected, the root object is tagged as a garbage collection root object, and the member objects are tagged as garbage collection member objects. The garbage collector makes a garbage collection determination (e.g., should these garbage collection objects be garbage collected?) for garbage collection root and zero, one or more garbage collection member objects. In the event it is determined that a garbage collection root and garbage collection member objects should be garbage collected, the garbage collection root object and all related garbage collection member objects are collected (e.g., the entire object tree representing the entity is garbage collected as a whole). In various embodiments, the garbage collection determination process include several checks, on the root, the members, and the relationship(s) between them, which lets the system determine whether to collect the root only, the root and few members, or the root and all members (e.g. a complete object tree, which is strongly connected, could be held in memory by a single relationship to a strongly connected member), or any other appropriate determination.

FIG. 1 is a block diagram illustrating an embodiment of a network system. In some embodiments, the network system of FIG. 1 comprises a system for an automated garbage collection architecture. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, and data storage system 106 communicate via network 100. In various embodiments, administrator system 102 comprises a system for an administrator to access data on data storage system 106, to create data structures on data storage system 106, to indicate removal of data structures on data storage system 106, or for any other appropriate purpose. User system 104 comprises a system for a user. In some embodiments, user system 104 comprises a system for accessing data storage system 106. Data storage system 106 comprises a system for managing an object-based database. In some embodiments, data storage system 106 comprises a system for storing data provided by a user (e.g., via user system 104 and network 100). In some embodiments, data storage system 106 comprises a system for removing data provided by a user. In some embodiments, data storage system 106 comprises a system for performing automated garbage collection.

Figure 2:
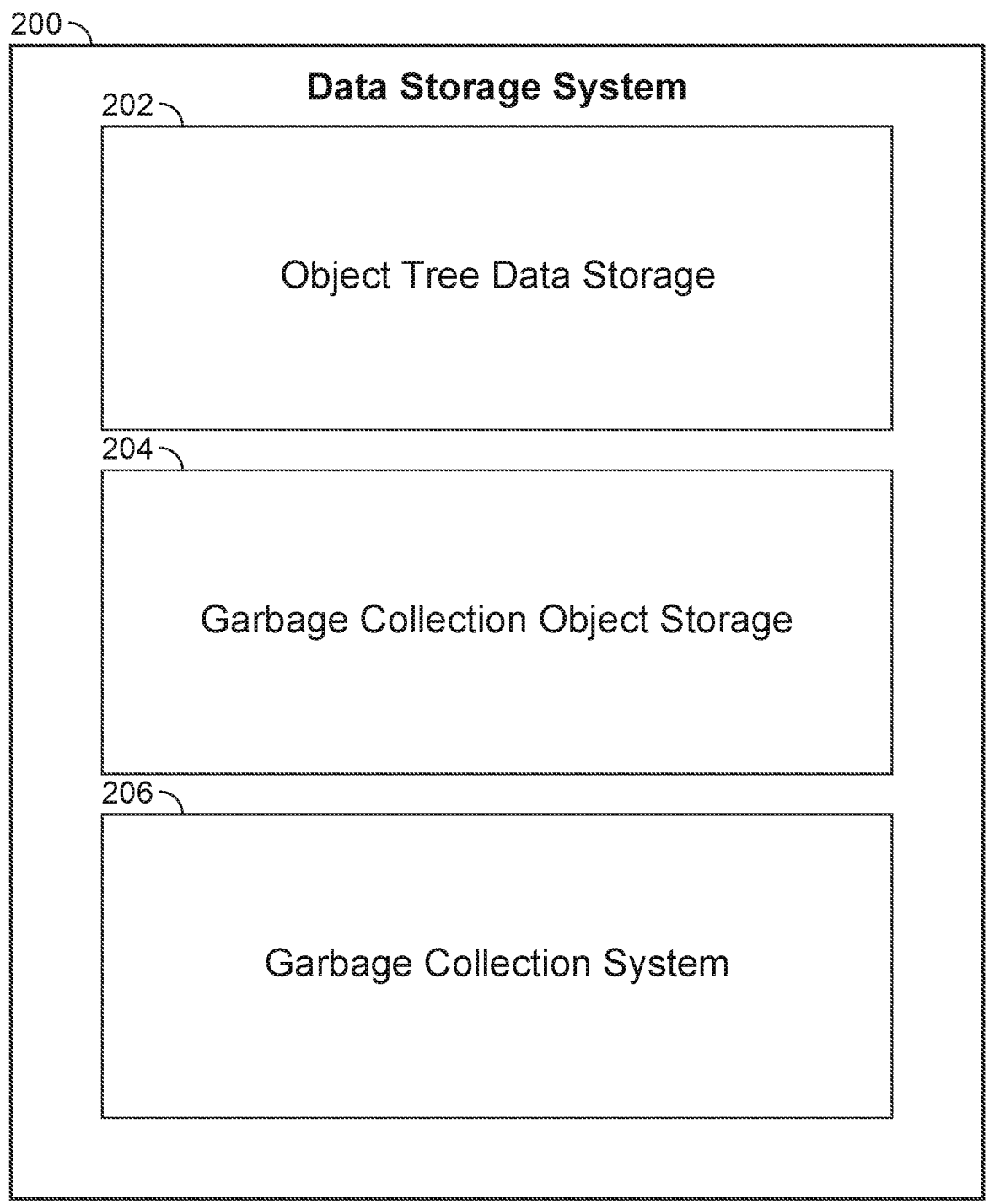
FIG. 2 is a block diagram illustrating an embodiment of a data storage system.

FIG. 2 is a block diagram illustrating an embodiment of a data storage system. In some embodiments, data storage system 200 of FIG. 2 comprises data storage system 106 of FIG. 1. In the example shown, data storage system 200 comprises a data storage system for automated garbage collection. Data storage system 200 comprises object tree data storage 202. In some embodiments, object tree data storage 202 comprises an object tree database (e.g., a database for storing database data structured as an object tree). In some embodiments, object tree data storage 202 comprises one or more garbage collection root objects (e.g., objects comprising garbage collection root metadata). In some embodiments, object tree data storage 202 comprises one or more garbage collection member objects (e.g., objects comprising garbage collection member metadata). In some embodiments, object tree data storage 202 comprises a semiconductor memory (e.g., a random access memory, e.g., a RAM). Data storage system 200 comprises garbage collection object storage 204. In some embodiments, garbage collection object storage comprises a storage for objects that have been garbage collected. In various embodiments, garbage collection object storage 204 comprises a storage for objects that have been archived, a storage for objects that have been purged, a temporary storage for objects that have been purged before permanent purging, or any other appropriate garbage collection object storage. In some embodiments, garbage collection object storage 204 comprises a separate physical memory from object tree data storage 202. In some embodiments, garbage collection object storage 204 comprises a magnetic memory (e.g., a hard disk). Data storage system 200 additionally comprises garbage collection system 206. In some embodiments, garbage collection system 206 comprises a system for identifying an object (e.g., an object stored in object tree data storage 202) for garbage collection. In some embodiments, garbage collection system 206 comprises a system for indicating to garbage collect an object. In various embodiments, garbage collecting an object comprises marking an object as garbage collected, moving an object to garbage collection object storage 204, permanently deleting an object, or performing any other appropriate garbage collection function. In some embodiments, garbage collection system 206 is implemented using a processor that is connected to a memory, which provides instructions to the processor.

Figure 3:
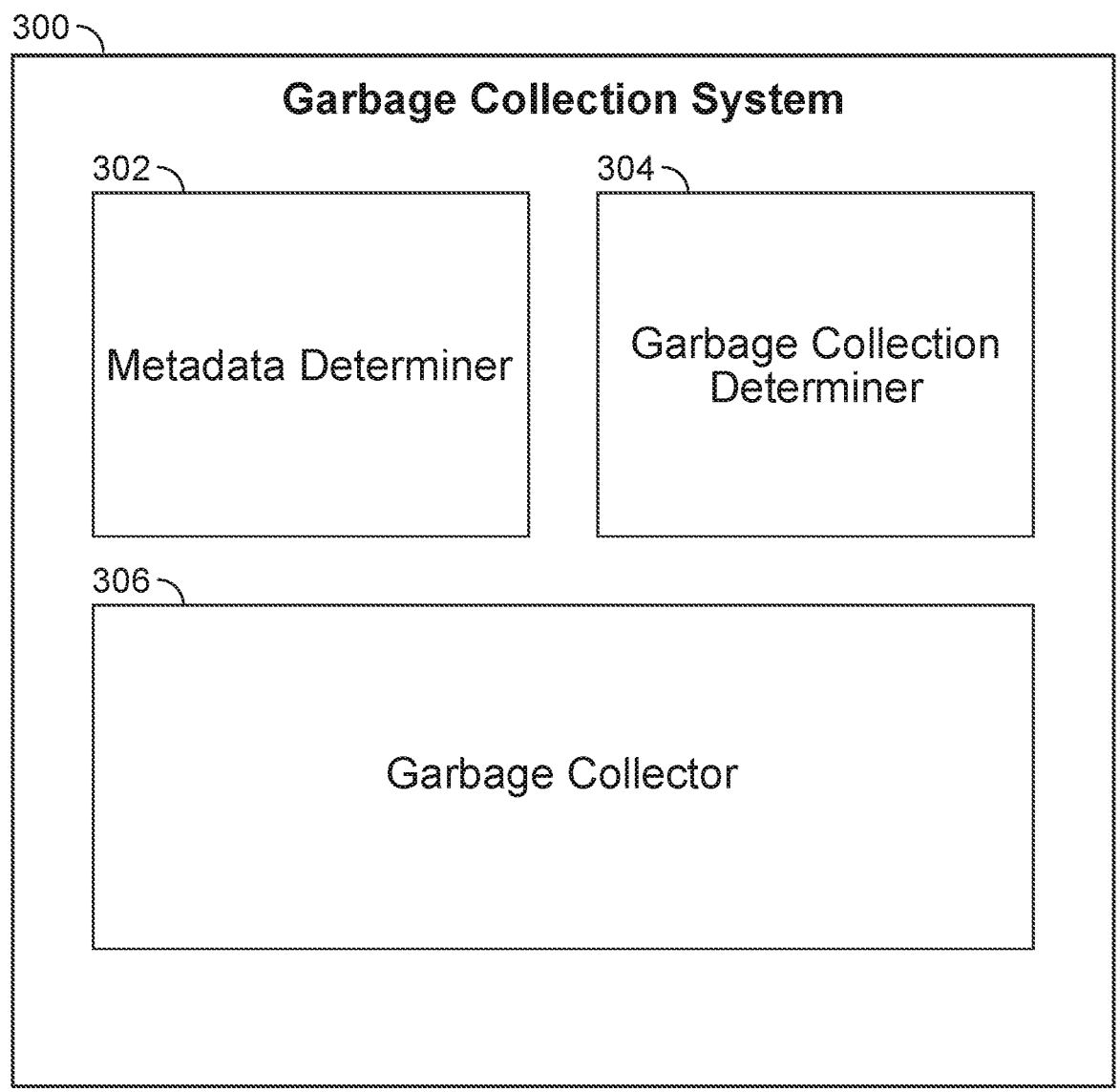
FIG. 3 is a block diagram illustrating an embodiment of a garbage collection system.

FIG. 3 is a block diagram illustrating an embodiment of a garbage collection system. In some embodiments, garbage collection system 300 comprises garbage collection system 206 of FIG. 2. In the example shown, garbage collection system 300 comprises metadata determiner 302. In some embodiments, metadata determiner 302 comprises a metadata determiner for determining metadata associated with an object. In some embodiments, metadata determiner 302 determines whether an object comprises a garbage collection root object (e.g., whether the object is associated with garbage collection root metadata). In some embodiments, metadata determiner 302 determines whether an object comprises a garbage collection member object (e.g., whether the object is associated with garbage collection member metadata). In some embodiments, an object comprises associated metadata (e.g., the metadata is stored as part of the object). In some embodiments, an object database stores object information and associated metadata. In some embodiments, garbage collection root metadata comprises inheriting from a garbage collection root class (e.g., the garbage collection root object inherits from a garbage collection root class). In some embodiments, garbage collection member metadata comprises inheriting from a garbage collection member class (e.g., the garbage collection member object inherits from a garbage collection member class). In some embodiments, metadata determiner 302 is implemented using a processor that is connected to a memory, which provides instructions to the processor. Garbage collection determiner 304 comprises a garbage collection determiner for determining whether an object (e.g., an object associated with garbage collection metadata) should be garbage collected. In various embodiments, garbage collection determiner 304 determines whether an object should be garbage collected based at least in part on its age, its relations to other objects, its associated data, or any other appropriate information. In some embodiments, garbage collection determiner 304 is implemented using a processor. Garbage collection system 300 additionally comprises garbage collector 306. In some embodiments, garbage collector 306 comprises a garbage collector for garbage collecting an object (e.g., an object that garbage collection determiner 304 determines should be collected). In some embodiments, garbage collector 306 is implemented using a processor that is connected to a memory, which provides instructions to the processor. In various embodiments, the elements of FIG. 3 are implemented on a single processor, each on a separate processor, or combined on a plurality of processors in any other appropriate way.

Figure 4A:
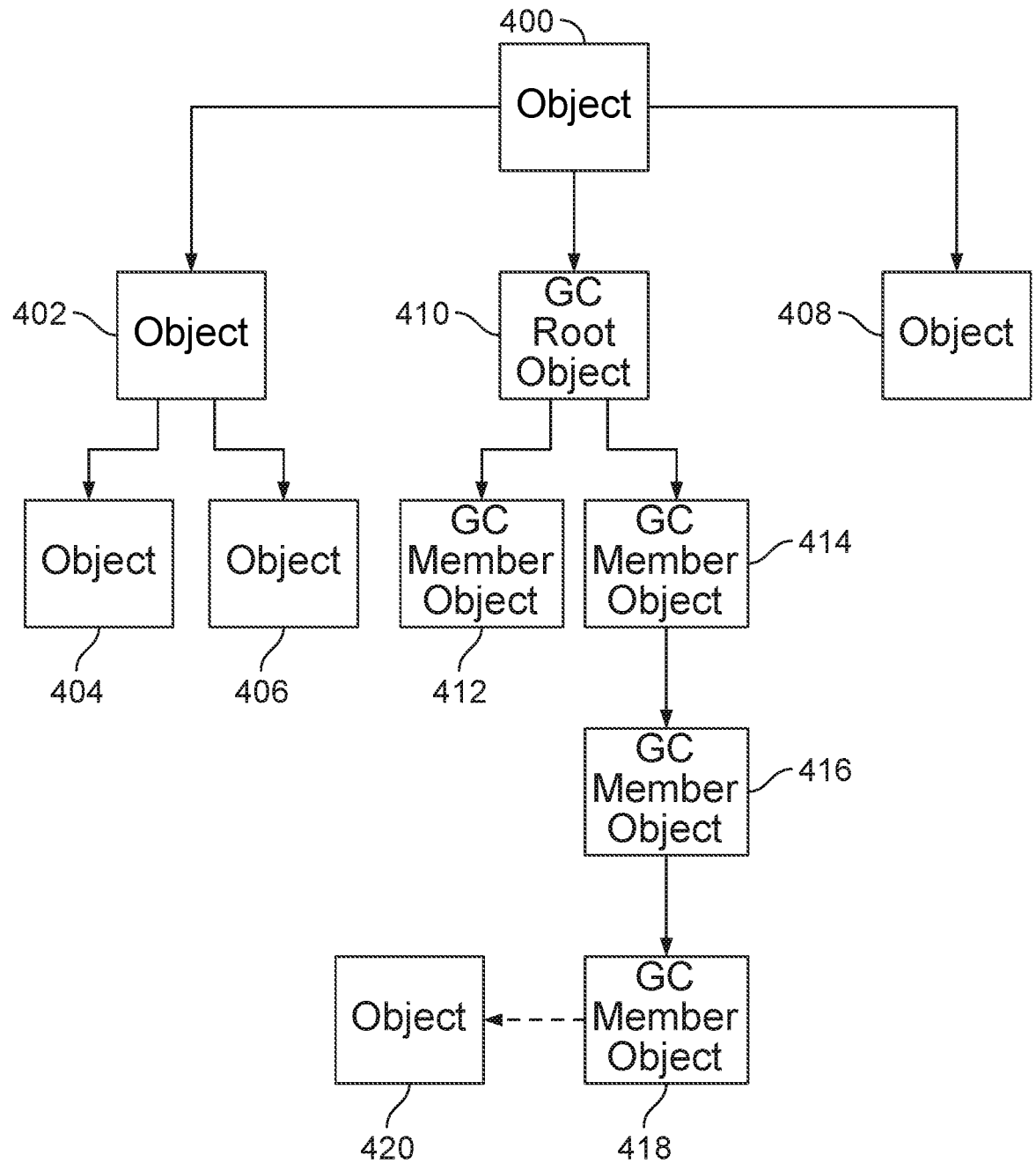
FIG. 4A is a block diagram illustrating an embodiment of an object tree.

FIG. 4A is a block diagram illustrating an embodiment of an object tree. In some embodiments, the object tree of FIG. 4A comprises an object tree stored in object tree data storage 202 of FIG. 2. In the example shown, object 400 comprises a top-level object. In some embodiments, an object tree comprises only one top-level object (e.g., a company or organization object). Object 402, object 404, and object 406 comprise a subtree of top-level object 400. Object 400 has a direct relation to object 402 (e.g., a relation with end points directly with the two objects) and indirect relations to object 404 and object 406 (e.g., a relation with intervening objects that have end points of relations that can be followed or walked to connect the two objects). Object 408 comprises a single object subtree of top-level object 400. GC (garbage collection) root object 410 comprises the top-level object of a subtree of object 410. GC root object 410 is associated with garbage collection root metadata. In some embodiments, GC root object 410 associated with garbage collection root metadata indicates that the subtree that GC root object 410 is at the top level of comprises a subtree that can be garbage collected. In some embodiments, all objects descending from the object are required to be associated with garbage collection member metadata, and the tree of garbage collection objects headed by GC root object 410 are all garbage collected together. In some embodiments, a GC root object represents an individually removable element of the database system (e.g., a payroll result, a performance review, etc.), and the member objects in the tree associated with the GC root object represent constituent parts of the element of the database system that should all be removed together. In the example shown, GC member object 412 and GC member object 414 have direct relations from GC root object 410 (e.g., there is a relation from GC root object 410 to GC member object 412 and from GC root object 410 to GC member object 414). GC member object 416 and GC member object 418 have indirect relations from GC root object 410 (e.g., there is a relation from GC root object 410 to GC member object 416 with intervening object GC member object 414, and there is a relation from GC root object 410 to GC member object 418 with intervening objects GC member object 414 and GC member object 416). GC member object 418 is connected to object 420 (e.g., an object that is not associated with garbage collection root metadata or garbage collection member metadata) via a weak relation. In some embodiments, a weak relation is the only kind of allowable relation from a garbage collection object to a non-garbage collection object. In some embodiments, a weak relation comprises a relation that can be broken when the garbage collection object is garbage collected. In some embodiments, a weak relation comprises a relation to an object that decorates or provides information about the object relating to it (e.g., name of a state or country, social media type, supervisor name, etc.).

Figure 4B:
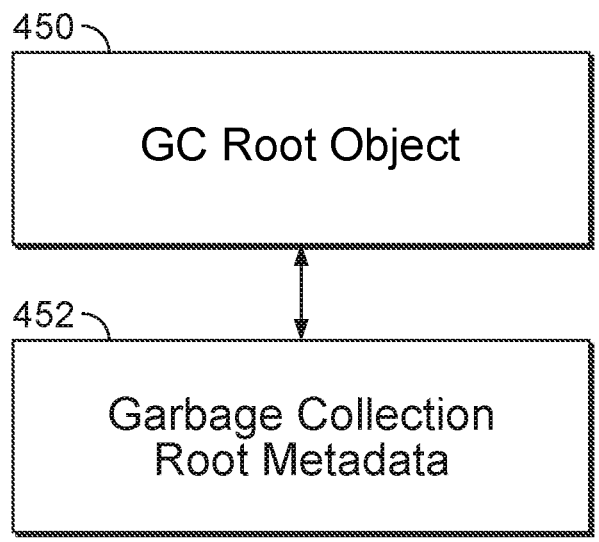
FIG. 4B is a block diagram illustrating an embodiment of a metadata association.

FIG. 4B is a block diagram illustrating an embodiment of a metadata association. In some embodiments, GC root object 450 of FIG. 4B comprises GC root object 410 of FIG. 4A. In the example shown, garbage collection root metadata 452 is associated with GC root object 450. An association with garbage collection root metadata 452 indicates whether or not a GC root object is eligible to be garbage collected. The metadata association is used to determine what is eligible for collection, and then the garbage collection algorithm traverses the garbage collection objects, using these associations along with a set of rules/checks to determine the final object tree or subgraph to garbage collect.

Figure 4C:
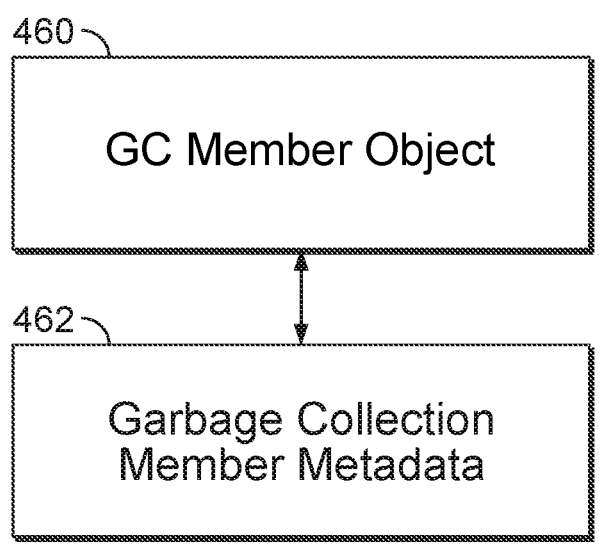
FIG. 4C is a block diagram illustrating an embodiment of a metadata association.

FIG. 4C is a block diagram illustrating an embodiment of a metadata association. In some embodiments, GC member object 460 of FIG. 4C comprises GC member object (e.g., GC member object 412, GC member object 414, GC member object 416, or GC member object 418) of FIG. 4A. In the example shown, garbage collection member metadata 462 is associated with GC member object 460. Garbage collection member metadata 462 indicates whether or not a GC member object is eligible to be garbage collected. The metadata association is used to determine what is eligible for collection, and then the garbage collection algorithm traverses the garbage collection objects, using these associations along with a set of rules/checks to determine the final object tree or subgraph to garbage collect.

Figure 5:
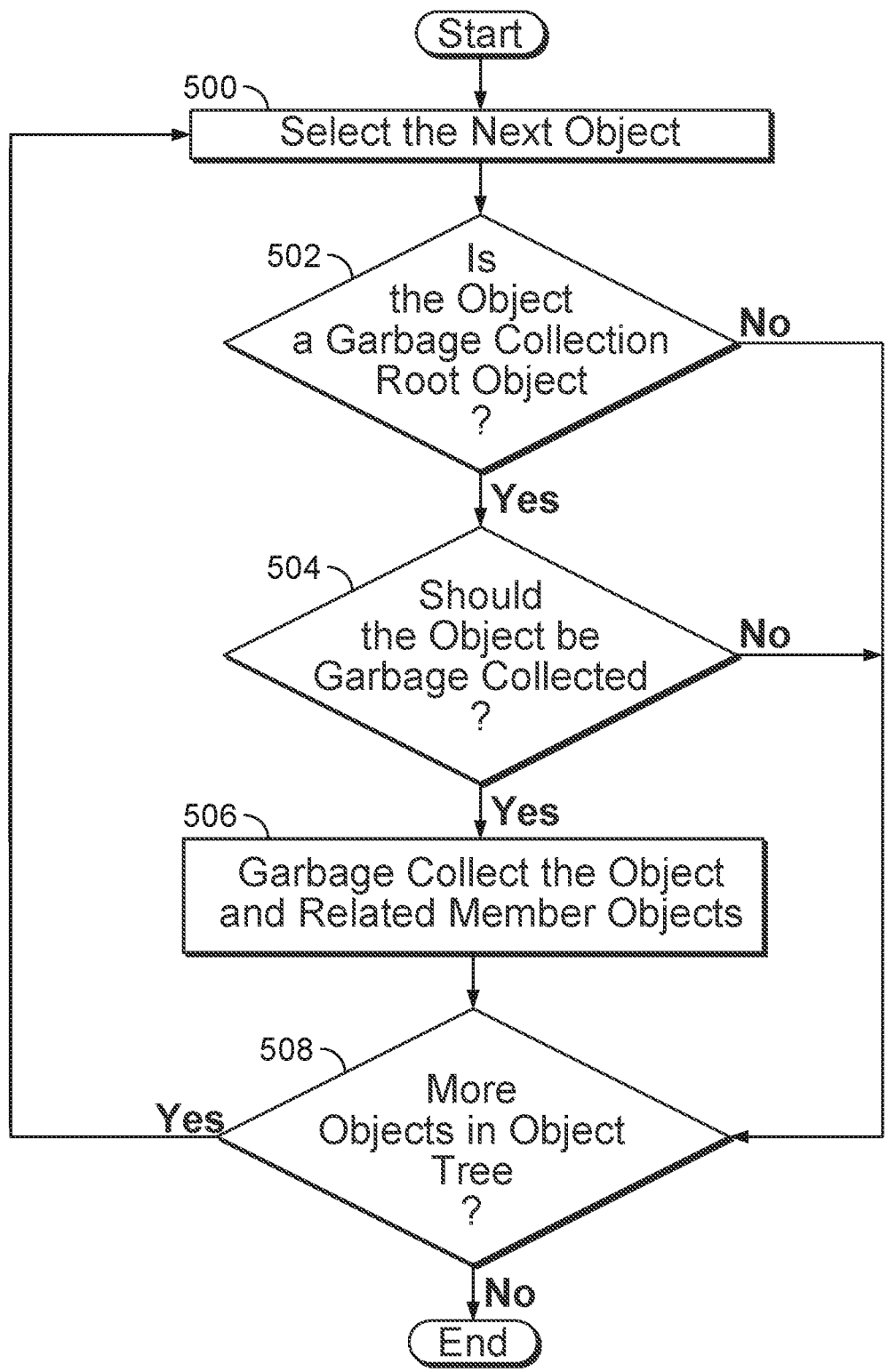
FIG. 5 is a flow diagram illustrating an embodiment of a process for data management.

FIG. 5 is a flow diagram illustrating an embodiment of a process for data management. In some embodiments, the process of FIG. 5 is executed by garbage collection system 300 of FIG. 3. In the example shown, in 500, the next object (e.g., the next object in an object tree) is selected. In some embodiments, the next object comprises the first object (e.g., a root object). In some embodiments, the next object comprises the next object according to a tree-traversal algorithm (e.g., depth-first, breadth-first, etc.). In some embodiments, the process of FIG. 5 comprises a scanning of an object tree. In some embodiments, the scanning excludes member objects below a root object. In various embodiments, the scanning is initiated according to a predetermined schedule (e.g., every day at midnight, every hour on the hour, etc.), the scanning is manually started, the scanning is initiated after a finalized process (e.g., a finalized payroll process, etc.), or the scanning is initiated at any other appropriate time.

In 502, it is determined whether the object is a garbage collection root object. In some embodiments, it is determined whether the object is a garbage collection root object by determining whether the object is associated with garbage collection root metadata. In the event it is determined that the object is not a garbage collection root object, control passes to 508. In the event it is determined that the object is a garbage collection root object, control passes to 504. In 504, it is determined whether the object should be garbage collected. In some embodiments, it is determined whether the object should be garbage collected using a garbage collection determiner (e.g., garbage collection determiner 304 of FIG. 3). In some embodiments, it is determined whether the object should be garbage collected using one or more garbage collection rules. In various embodiments, garbage collection rules are based at least in part on object age, object relations to other objects, object associated data, or any other appropriate information. For example, in the event that the object has no relations, the object should be garbage collected as the object is likely not visible and not useful to the system. As another example, in the event that the object is marked as deleted, the object has an attribute that indicates that the object may be garbage collected (e.g., only in the event that the object is a root, the object is garbage collected). In the event it is determined that object should not be garbage collected, control passes to 508. In the event it is determined that the object should be garbage collected, control passes to 506. In 506, the object and related member objects are garbage collected. In some embodiments, from a root object that is to be garbage collected, a recursive traversal is done to find members of the garbage collection island to collect. In various embodiments, the recursive traversal of the object tree comprises a depth first traversal, a breadth first traversal, or any other appropriate traversal. In 508, it is determined whether there are more objects in the object tree. In the event it is determined that there are no more objects in the object tree, the process ends. In the event it is determined that there are more objects in the object tree, control passes to 500. In some embodiments, in the event it was determined that the previous object is a garbage collection root object, which is not to be garbage collected, then an object related to the garbage collection root object is not selected as the next object (e.g., either a tree of garbage collection objects is garbage collected all together, or it is all skipped, based on the evaluation of the garbage collection root object). In some embodiments, instructions for the steps of the process of FIG. 5 are stored in a memory and provided for execution by a processor coupled to the memory. In various embodiments, the memory comprises a magnetic memory, a solid-state memory, an optical memory, or any other appropriate memory.

Figure 6:
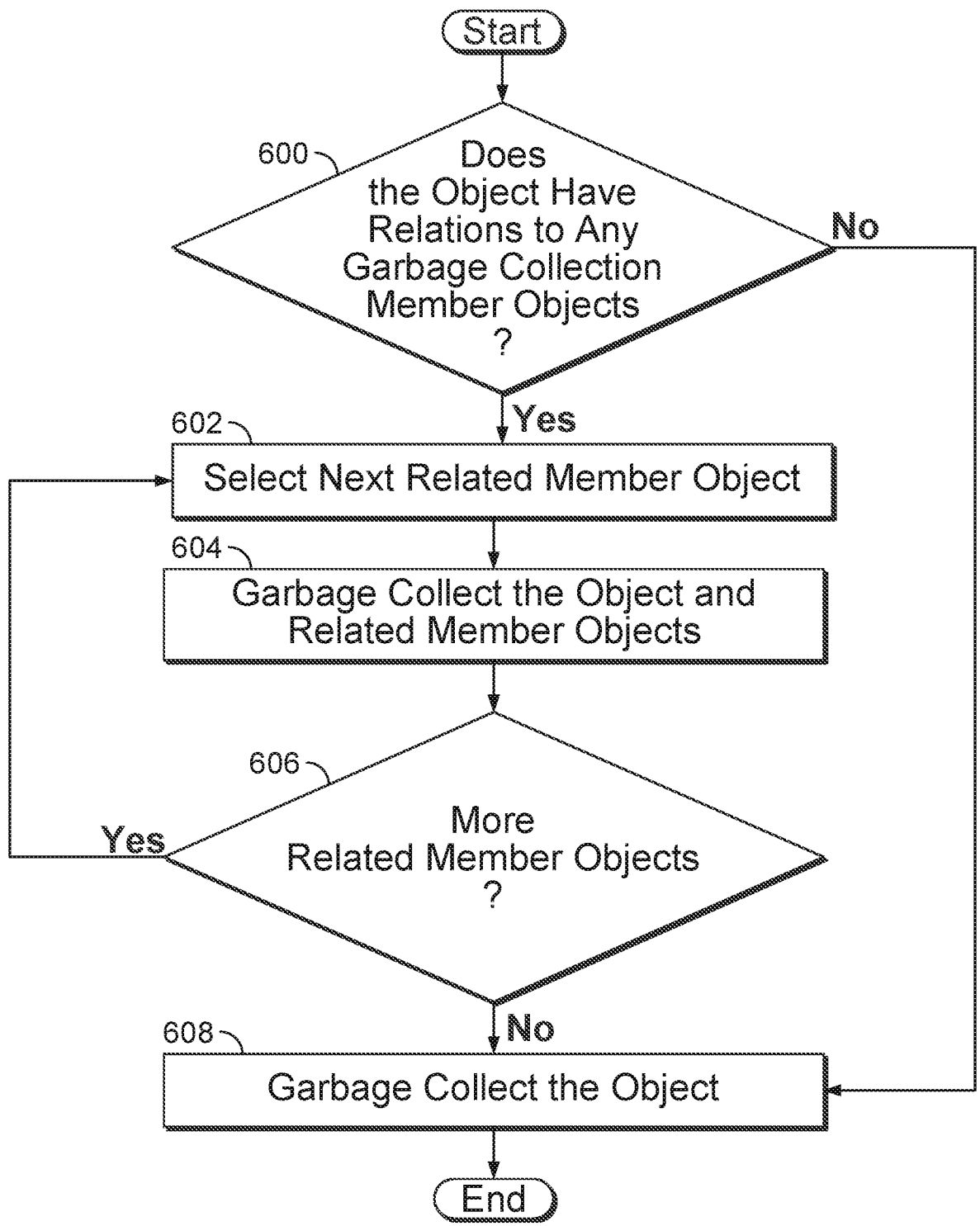
FIG. 6 is a flow diagram illustrating an embodiment of a process for garbage collecting an object and related member objects.

FIG. 6 is a flow diagram illustrating an embodiment of a process for garbage collecting an object and related member objects. In some embodiments, the process of FIG. 6 implements 506 of FIG. 5. In the example shown, in 600, it is determined whether the object has relations to any garbage collection member objects (e.g., whether there are any garbage collection member children in the object tree). In the event it is determined that the object does not have relations to any garbage collection member objects, control passes to 608. In the event it is determined that the object has relations to garbage collection member objects, control passes to 602. In 602, the next related member object is selected. In 604, the object and related member objects are garbage collected. In 606, it is determined whether there are more related member objects. In the event it is determined that there are more related member objects, control passes to 602. In the event it is determined that there are not more related member objects, control passes to 608. In 608, the object is garbage collected, and the process ends. In various embodiments, garbage collecting the object comprises marking the object (e.g., marking the object as garbage collected or preparing to be garbage collected), disconnecting the object or the group of objects to be garbage collected (e.g., disconnecting relations to the object or the group of objects to be garbage collected), deleting the object, marking and then deleting the object, marking as preparing to be garbage collected then deleting and then marking as garbage collected, or performing any other appropriate garbage collection action. In some embodiments, deletion of objects after they are marked is performed by a background process (e.g., a low priority background process). In some embodiments, deletion of objects after they are moved is performed by a background process. In some embodiments, the process of FIG. 6 implements 604 (e.g., the process is recursive).

Figure 7:
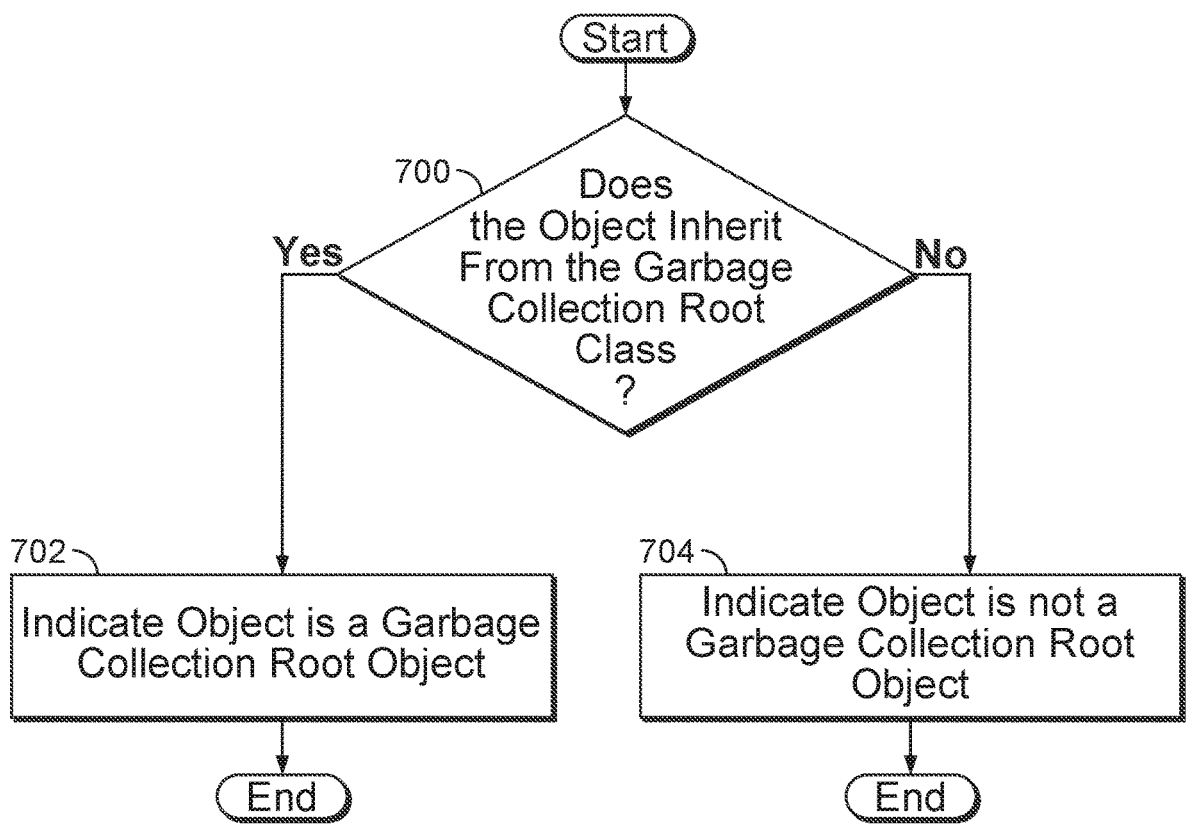
FIG. 7 is a flow diagram illustrating an embodiment of a process for determining whether an object is a garbage collection root object.

FIG. 7 is a flow diagram illustrating an embodiment of a process for determining whether an object is a garbage collection root object. In some embodiments, the process of FIG. 7 implements 502 of FIG. 5. In the example shown, in 700, it is determined whether the object inherits from the garbage collection root class. In various embodiments, it is determined whether the object inherits from the garbage collection root class by querying the object, by accessing an object database, by accessing a description of object types, or in any other appropriate way. In the event it is determined that the object inherits from the garbage collection root class, control passes to 702. In 702, it is indicated that the object is a garbage collection root object, and the process ends. In the event it is determined in 700 that the object does not inherit from the garbage collection root class, control passes to 704. In 704, it is indicated that the object is not a garbage collection root object.

Figure 8:
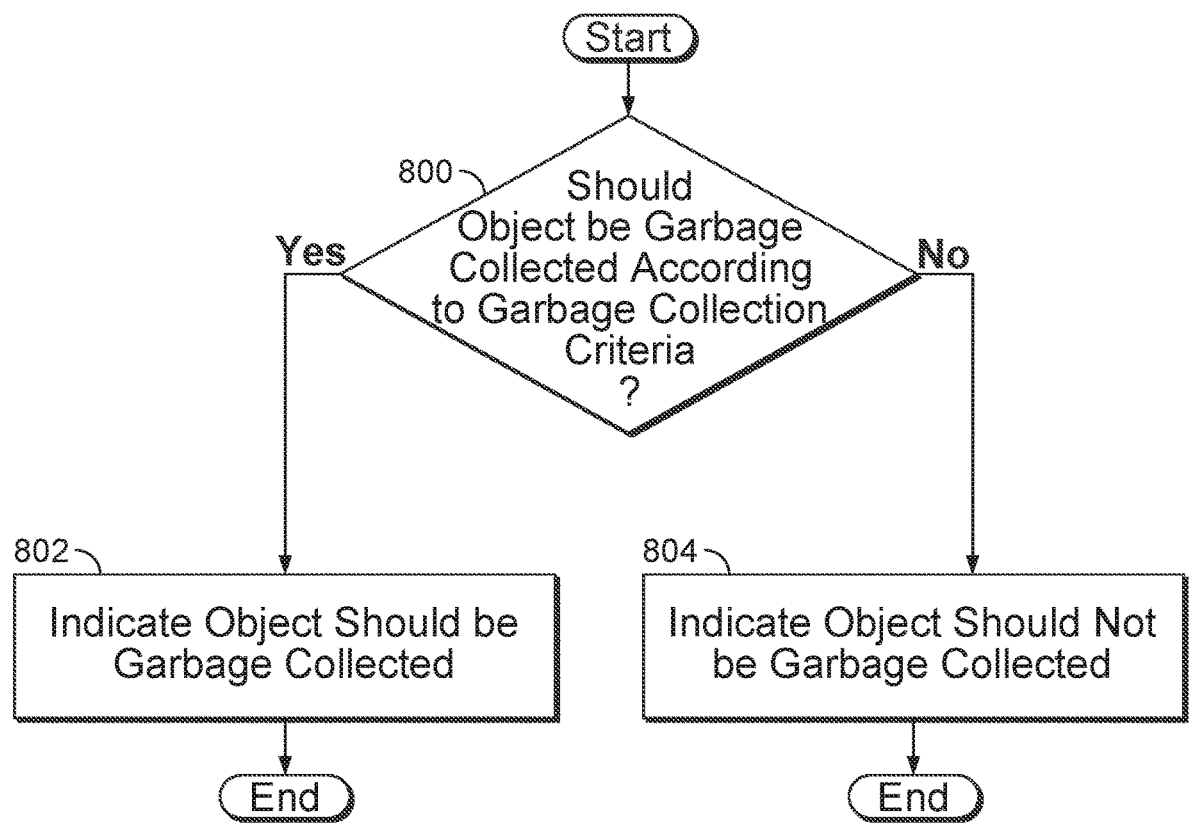
FIG. 8 is a flow diagram illustrating an embodiment of a process for determining if an object should be garbage collected.

FIG. 8 is a flow diagram illustrating an embodiment of a process for determining if an object should be garbage collected. In some embodiments, the process of FIG. 8 implements 504 of FIG. 5. In the example shown, in 800, it is determined whether the object should be collected according to the garbage collection criteria. In various embodiments, garbage collection criteria are based at least in part on object age, object relations to other objects, object associated data, or any other appropriate garbage collection criteria. In some embodiments, a garbage collection criteria comprises software written by an application developer for determining whether an object should be garbage collected. In the event it is determined that the object should be garbage collected, control passes to 802. In 802, it is indicated that the object should be garbage collected and the process ends. In the event it is determined in 800 that the object should not be garbage collected, control passes to 804. In 804, it is indicated that the object should not be garbage collected.

Figure 9:
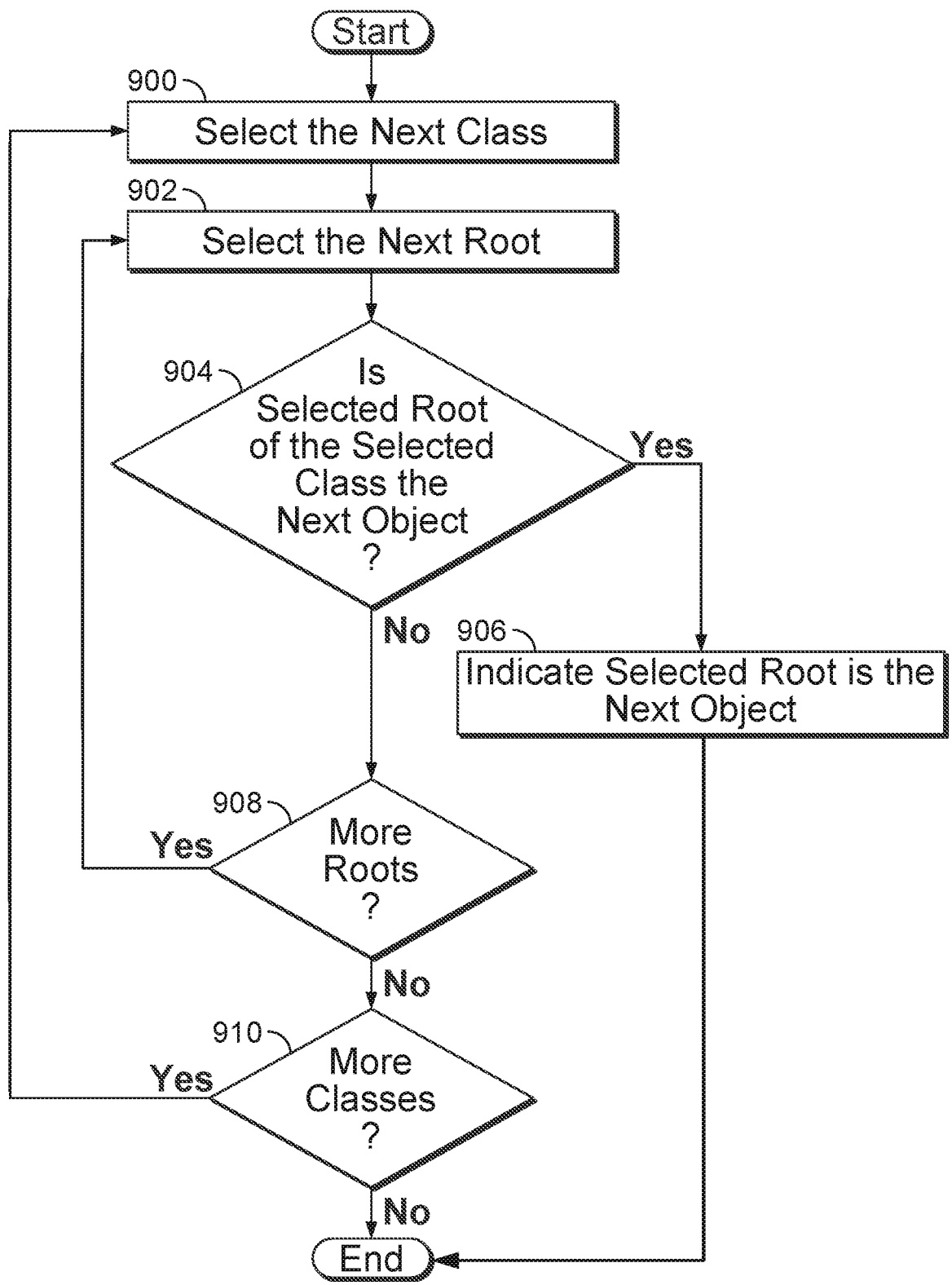
FIG. 9 is a flow diagram illustrating an embodiment of a process for selecting the next object.

FIG. 9 is a flow diagram illustrating an embodiment of a process for selecting the next object. In some embodiments, the process of FIG. 9 implements 500 of FIG. 5. In the example shown, a linear scan of all roots per class is done to identify a next object. In 900, the next class is selected. In 902, the next root is selected. In 904, it is determined whether the selected root of the selected class is the next object. In the event that the selected root of the selected class is the next object, in 906 it is indicated that the selected root is the next object, and the process ends. In the event that the selected root of the selected class is not the next object, in 908 it is determined whether there are more roots. In the event that there are more roots, control passes to 902. In the event that there are not more roots, in 910 it is determined whether there are more classes. In the event that there are more classes, control passes to 900. In the event that there are not more classes, the process ends.

Figure 10:
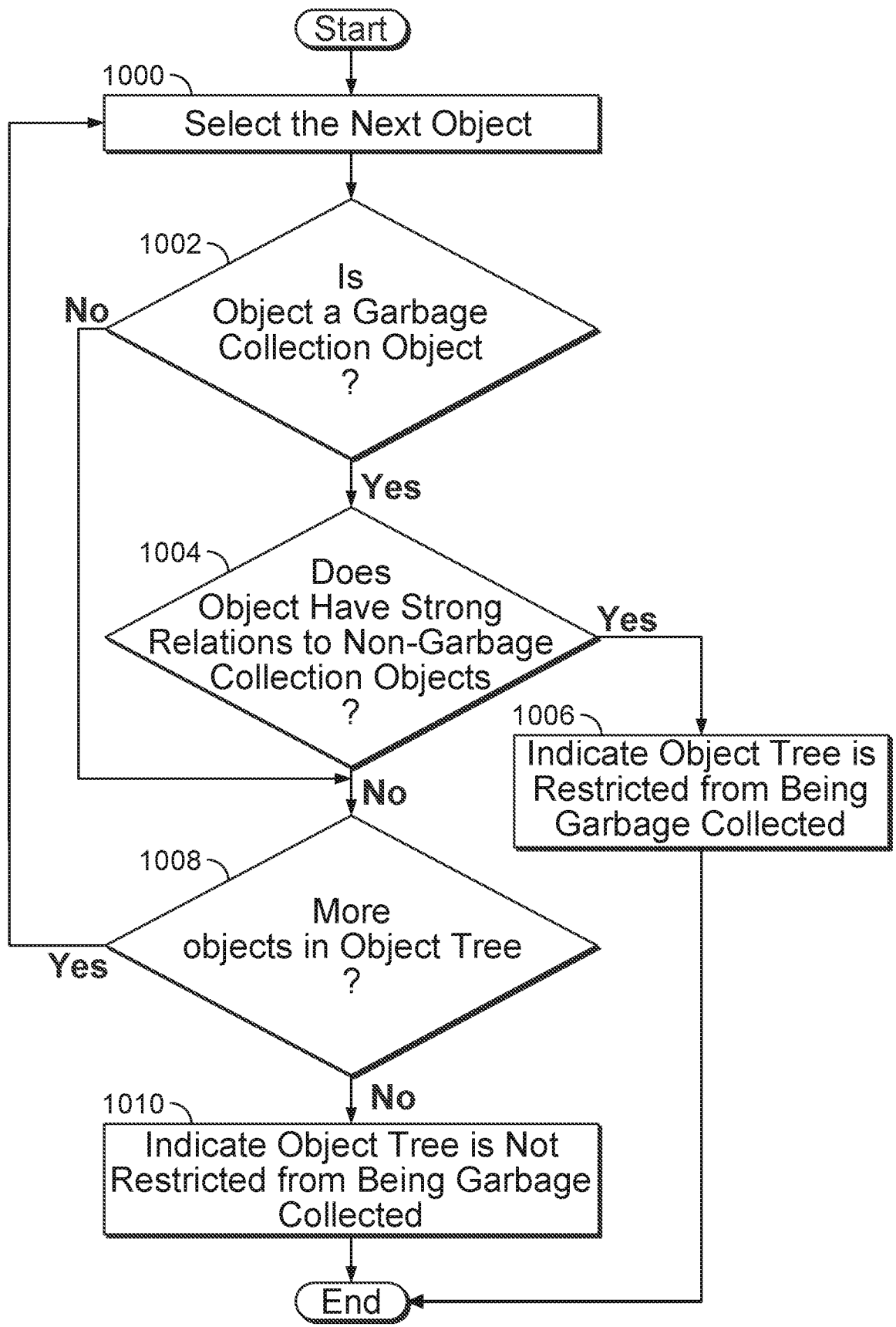
FIG. 10 is a flow diagram illustrating an embodiment of a process for determining if an object tree is valid.

FIG. 10 is a flow diagram illustrating an embodiment of a process for determining whether an object tree is restricted or not restricted from being garbage collected. In some embodiments, the process of FIG. 10 determines whether an object stored in an object tree data storage (e.g., object tree data storage 202 of FIG. 2) is restricted or not restricted from being garbage collected. In some embodiments, the process of FIG. 10 is executed by a garbage collection system (e.g., garbage collection system 206 of FIG. 2) prior to executing a garbage collection process. In the example shown, in 1000, the next object is selected. In some embodiments, the next object comprises the first object (e.g., the top-level object). In some embodiments, the next object is selected according to a recursive traversal of the object tree (e.g., a depth-first traversal, a breadth-first traversal, etc.). In 1002, it is determined whether the object is a garbage collection object. In some embodiments, it is determined whether the object is a garbage collection object by determining whether the object is associated with garbage collection root metadata or garbage collection member metadata and examining a data value stored as metadata. In the event it is determined that the object is not a garbage collection object, control passes to 1008. In the event it is determined that the object is a garbage collection object, control passes to 1004. In 1004, it is determined whether the object has strong relations to non-garbage collection objects. In the event it is determined that the object has strong relations to non-garbage collection objects, control passes to 1006. In 1006, it is indicated that the object tree is restricted from being garbage collected, and the process ends. In the event it is determined that the object does not have strong relations to non-garbage collection objects, control passes to 1008. In 1008, it is determined whether there are more objects in the object tree. In the event it is determined that there are more objects in the object tree, control passes to 1000. In the event it is determined that there are not more objects in the object tree, control passes to 1010. In 1010, it is indicated that the object tree is not restricted from being garbage collected.

In some embodiments, the determination of whether or not to perform garbage collection is based at least in part on the root. In some embodiments, the determination of whether or not to perform garbage collection always starts with the root and then moves onto its associated member(s). In the event that the root is not designated to be garbage collected, nothing is garbage collected. In the event that the root is designated to be garbage collected, then what gets garbage collected depends on different checks on the members, the relationships, etc. In various embodiments, a check on whether a garbage collection island can be collected comprises one or more of the following: 1) a check that all GC objects (root or member) are associated with GC metadata; 2) a check that GC objects have not been updated for a defined period of time (e.g., a period of 17 days); 3) a check that GC objects are not referenced by a non-GC object (e.g., where referenced means owned through a "Strong" relationship or through a "ReferenceBy" relationship); 4) a check that all objects connected through "Strong" references are collected together, where the objects form a GC island of GC roots and GC members that are connected through "Strong" and "Weak" references, and where "Weak" references can be split and collected in different GC islands; 5) a check that a GC island that is ready for garbage collection contains only one root; 6) a check that a GC island includes not more than a maximum number of instances (e.g., 200 instances) and a maximum number graph depth levels (e.g., 20 graph depth levels); 7) a check that no inconsistent data exists—for example, a check that the GC island has a root, a check that GC objects are archived, a check that object has an unexpected state or unexpected stack, etc., or any other appropriate check.

In some embodiments, in the event that an object is coupled to an object that is to be garbage collected and the coupling is a weak reference then an attempt is made to include the object in the garbage collection island or group but if for some reason the object is used by other objects the object is not included in the garbage collection island or group. For example, an address in a pay slip has a one way relation (e.g., address does not point to pay slip, but pay slip points to address) so this coupling can be disconnected and the pay slip object can be garbage collected and the address can remain in memory. In some embodiments, in the event that an object is coupled to an object that is to be garbage collected and the coupling is a strong reference then the relation is not disconnected and the object is not garbage collected (e.g., not included in the garbage collection island or group) and the object that is designated to be garbage collected is also not garbage collected (e.g., not included in the garbage collection island or group).

In some embodiments, there are three types of relationships:

1. 2-way relationship "Owns" or "OwnedBy" (e.g., object A Owns object B, or object B is OwnedBy object A, this normally implies the same data life-cycle with respect to garbage collection; B cannot exist without A)
2. 2-way relationship "References" or "ReferencedBy" (e.g., object A References object B, or object B is ReferencedBy object A, this normally implies that object A uses B, but they are mostly independent)
3. 1-way relationship (e.g., object A references object B)

For objects associated with GC metadata (e.g., for those objects that are subject to garbage collection, that are connected to a GC class, etc.), the objects have a "Relationship Type" defined. For garbage collection, GC island (e.g., GC Root+zero or more GC Members) determination and identification are based at least in part on the defined Relationship Type. In some embodiments, an "Owns" relationship comprises a "Strong" relationship with the consequence that the two instances are both garbage collected or are both not garbage collected—the two instances both exist or the two instances both do not exist (e.g., the instances share the same data life-cycle with respect to garbage collection). In some embodiments, a "References" relationship comprises a "Weak" relationship (e.g., a "WeakReference") with the consequence that the two instances may or may not be garbage collected together (e.g., the instances do or do not share the same data life-cycle with respect to garbage collection). In some embodiments, a GC island (e.g., GC Root+zero or more GC Members) is decoupled from connected objects based at least in part on a "WeakReference." For example, a "WeakReference" comprises a 2-way relationship for certain purposes; however, for garbage collection purposes a "WeakReference" is only traversed in one direction—so for garbage collection the relationship is decoupled for the direction opposite the traversal direction.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for data management, comprising:
an object designated as a root object, wherein the root object is associated with a garbage collection root metadata;
one or more member objects, wherein each of the one or more member objects is associated with a garbage collection member metadata, wherein the root object has a direct relation or an indirect relation to each of the one or more member objects; and a processor to:
determine whether the root object and the one or more member objects are to be garbage collected, comprising to:
follow a relation from a member object of the one or more member objects to a non-garbage collection object;
in response to determining that the relation does not comprise a one way relation, indicate the root object and the one or more member objects are restricted from being garbage collected, wherein the one way relation comprises a first object referencing a second object but the second object not referencing the first object; and
in response to determining that the relation comprises the one way relation, garbage collect the root object and the one or more member objects, wherein garbage collecting the root object and the one or more member objects comprises:
in response to determining that the non-garbage collection object is not used by at least one other non-garbage collection object, garbage collecting the non-garbage collection object; and
in response to determining that the non-garbage collection object is used by the at least one other non-garbage collection object, disconnecting the relation; and
a memory configured to store instructions for the processor.

2. The system of claim 1, wherein the root object inherits from a garbage collection root class.

3. The system of claim 1, wherein the member object of the one or more member objects inherits from a garbage collection member class.

4. The system of claim 1, wherein the direct relation comprises a relation from the root object to the member object of the one or more member objects.

5. The system of claim 1, wherein the indirect relation comprises a relation from the root object to the member object of the one or more member objects with one or more intervening objects.

6. The system of claim 1, wherein determining whether the root object and the one or more member objects are to be garbage collected occurs during a scanning of an object graph.

7. The system of claim 6, wherein the scanning excludes member objects below the root object.

8. The system of claim 6, wherein the scanning is initiated according to a predetermined schedule.

9. The system of claim 6, wherein the scanning is manually started.

10. The system of claim 6, wherein the scanning is initiated after a finalized process.

11. The system of claim 1, wherein garbage collecting the root object and the one or more member objects further comprises marking the root object and the one or more member objects.

12. The system of claim 1, wherein garbage collecting the root object and the one or more member objects further comprises disconnecting the root object and the one or more member objects.

13. The system of claim 1, wherein garbage collecting the root object and the one or more member objects further comprises deleting the root object and the one or more member objects.

14. The system of claim 1, wherein garbage collecting the root object and the one or more member objects further comprises marking and then deleting the root object and the one or more member objects.

15. The system of claim 1, wherein garbage collecting the root object and the one or more member objects further comprises moving and then deleting the root object and the one or more member objects.

16. The system of claim 15, wherein the root object and the one or more member objects are deleted by a background process.

17. The system of claim 1, wherein determining whether the root object and the one or more member objects are to be garbage collected is based at least in part on root object relations.

18. The system of claim 1, wherein determining whether the root object and the one or more member objects are to be garbage collected is based at least in part on root object age.

19. The system of claim 1, wherein determining whether the root object and the one or more member objects are to be garbage collected is based at least in part on root object data.

20. A method for data management, comprising:
  receiving an object designated as a root object, wherein the root object is associated with a garbage collection root metadata;
  receiving one or more member objects, wherein each of the one or more member objects is associated with a garbage collection member metadata, wherein the root object has a direct relation or an indirect relation to each of the one or more member objects;
  determining, using a processor, whether the root object and the one or more member objects are to be garbage collected, comprising:
    following a relation from a member object of the one or more member objects to a non-garbage collection object;
    in response to determining that the relation does not comprise a one way relation, indicating the root object and the one or more member objects are restricted from being garbage collected, wherein the one way relation comprises a first object referencing a second object but the second object not referencing the first object; and
    in response to determining that the relation comprises the one way relation, garbage collecting the root object and the one or more member objects, wherein garbage collecting the root object and the one or more member objects comprises:
      in response to determining that the non-garbage collection object is not used by at least one other non-garbage collection object, garbage collecting the non-garbage collection object; and
      in response to determining that the non-garbage collection object is used by the at least one other non-garbage collection object, disconnecting the relation.

21. A computer program product for data management, the computer program product being embodied in a non-transitory computer readable storage medium and comprising computer instructions for:
  receiving an object designated as a root object, wherein the root object is associated with a garbage collection root metadata;
  receiving one or more member objects, wherein each of the one or more member objects is associated with a garbage collection member metadata, wherein the root object has a direct relation or an indirect relation to each of the one or more member objects;
  determining whether the root object and the one or more member objects are to be garbage collected, comprising:
    following a relation from a member object of the one or more member objects to a non-garbage collection object;
    in response to determining that the relation does not comprise a one way relation, indicating the root object and the one or more member objects are restricted from being garbage collected, wherein the one way relation comprises a first object referencing a second object but the second object not referencing the first object; and
    in response to determining that the relation comprises the one way relation, garbage collecting the root object and the one or more member objects, wherein garbage collecting the root object and the one or more member objects comprises:
      in response to determining that the non-garbage collection object is not used by at least one other non-garbage collection object, garbage collecting the non-garbage collection object; and
      in response to determining that the non-garbage collection object is used by the at least one other non-garbage collection object, disconnecting the relation.

* * * * *